United States Patent
Hans et al.

(10) Patent No.: US 12,289,013 B2
(45) Date of Patent: Apr. 29, 2025

(54) STATOR FOR AN ELECTRICAL AXIAL FLUX MACHINE AND ELECTRIC AXIAL FLUX MACHINE

(71) Applicant: Schaeffler Technologies AG & Co. KG, Herzogenaurach (DE)

(72) Inventors: Dominik Hans, Muggensturm (DE); Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 17/928,334

(22) PCT Filed: May 3, 2021

(86) PCT No.: PCT/DE2021/100399
§ 371 (c)(1),
(2) Date: Nov. 29, 2022

(87) PCT Pub. No.: WO2021/239179
PCT Pub. Date: Dec. 2, 2021

(65) Prior Publication Data
US 2023/0216357 A1 Jul. 6, 2023

(30) Foreign Application Priority Data

May 29, 2020 (DE) .......................... 102020114441.5

(51) Int. Cl.
*H02K 1/14* (2006.01)
*H02K 21/24* (2006.01)

(52) U.S. Cl.
CPC ............. *H02K 1/146* (2013.01); *H02K 21/24* (2013.01)

(58) Field of Classification Search
CPC .......... H02K 21/24; H02K 1/182; H02K 1/16; H02K 1/146
See application file for complete search history.

(56) References Cited

U.S. PATENT DOCUMENTS

| | | | |
|---|---|---|---|
| 2009/0243422 A1* | 10/2009 | Atarashi | H02K 1/165 310/216.074 |
| 2011/0309726 A1* | 12/2011 | Carpenter | H02K 21/24 310/75 R |
| 2015/0372545 A1 | 12/2015 | Lucchi | |

FOREIGN PATENT DOCUMENTS

| | | |
|---|---|---|
| CN | 1808846 A | 7/2006 |
| CN | 102365810 A | 2/2012 |
| CN | 107615012 A | 1/2018 |
| CN | 110391723 A | 10/2019 |
| CN | 109274240 | 11/2020 |
| DE | 102015223766 | 6/2017 |
| DE | 102017204347 | 9/2018 |
| DE | 102019000666 | 8/2019 |
| EP | 2985893 | 2/2016 |
| GB | 2482928 | 2/2012 |

(Continued)

*Primary Examiner* — Terrance L Kenerly
(74) *Attorney, Agent, or Firm* — Volpe Koenig

(57) ABSTRACT

A stator for an electric axial flux machine, more particularly a stator for an axial flux machine designed as a prime mover for an electrically driven motor vehicle, which stator includes a stator body with a plurality of stator teeth distributed around the circumference and stator windings. At least one of the wound stator teeth is split, seen in the radial direction, into at least two stator part teeth, wherein the at least two stator part teeth are wound with a different number of turns of the stator winding.

17 Claims, 6 Drawing Sheets

(56) References Cited

FOREIGN PATENT DOCUMENTS

GB  2545306  6/2017
WO  2008019954  2/2008

* cited by examiner

STATOR FOR AN ELECTRICAL AXIAL FLUX MACHINE AND ELECTRIC AXIAL FLUX MACHINE

CROSS-REFERENCE TO RELATED APPLICATIONS

This application is the U.S. National Phase of PCT Appln. No. PCT/DE2021/100399, filed May 3, 2021, which claims the benefit of German Patent Appln. No. 10 2020 114 441.5, filed May 29, 2020, the entire disclosures of which are incorporated by reference herein.

TECHNICAL FIELD

The present disclosure relates to a stator for an electric axial flux machine, in particular a stator for a permanently excited axial flux machine, designed as a prime mover for an electrically driven motor vehicle, comprising a stator body with a plurality of stator teeth distributed around the circumference and stator windings, which are arranged around the stator teeth, which are advantageously wound around a plurality of the stator teeth and are each designed as a winding concentrated as a single-tooth winding. Furthermore, the disclosure relates to an electric axial flux machine.

BACKGROUND

Axial flux machines are already well known from the prior art.

An electric axial flux machine with a stator and a rotor is known from EP 2 985 893 A1, wherein the stator comprises at least two stator segments, and wherein the rotor is connected to a rotor shaft, wherein the rotor and/or the rotor shaft are rotatably mounted in a bearing, and wherein the stator segments are arranged immovably relative to the bearing in the direction of rotation of the rotor. At least one of the stator segments is arranged to be movable in the axial or radial direction relative to the bearing to adjust the width of the air gap between the rotor and the stator segments.

SUMMARY

The disclosure is based on the object of providing a stator for an axial flux machine in which the maximum electric loading is increased compared to stators of the same size. Furthermore, the disclosure is based on the object of providing a corresponding axial flux machine in which the maximum electric loading within the stator is increased. For a given number of stator teeth in an axial flux machine, a fixed angular range is available for each stator tooth. This means that a smaller circumferential length is available radially further inwards than with radially further outwards regions of the stator teeth. The available circumferential length is split between the flux-conducting element, winding, insulation, etc. In the prior art, the windings and insulation typically have a constant cross-section along the winding around the flux-conducting element. As a result, the winding and insulation require an increasingly larger angular range for smaller radii, while an increasingly smaller angular range is available for the flux-conducting element. In order not to fall below a minimum width of the flux-conducting elements, the circumferential widths and thus the cross-sections of the winding and insulation are limited.

The object is achieved by a stator for an electric axial flux machine, in particular a permanently excited axial flux machine, having one or more of the features disclosed herein, and by an electric machine having one or more of the features disclosed herein.

An electric axial flux machine according to the disclosure comprises a stator body with a plurality of stator teeth distributed around the circumference and stator windings (3), which are arranged around the stator teeth (11).

At least one of the wound stator teeth—preferably all stator teeth—is/are split, seen in the radial direction, into at least two stator part teeth, wherein the at least two stator part teeth are wound with a different number of turns of the stator winding. Particularly preferably, the two stator part teeth are wound with a different number of turns of the same phase of the stator winding. Advantageously, the at least two stator part teeth are spaced apart in the radial direction by a separating groove extending in the circumferential direction and formed at axial depth. By splitting the stator teeth and windings as proposed according to the disclosure, more winding cross-section can be arranged in radially more outer areas of the stator without the tooth width in radially more inner areas of the stator having to be unfavorably small in the circumferential direction. In the present exemplary embodiment, the stator body is formed as a segmented stator body with a plurality of stator segments or individual stator teeth circumferentially assembled to form a circular ring-shaped stator body. Alternatively, the stator body can also be formed in one piece.

First, the individual elements of the disclosure are explained in the order in which they are mentioned, and then particularly preferred embodiments of the subject matter of the disclosure are described.

The magnetic flux in an electric axial flux machine (AFM), such as an electric prime mover of a motor vehicle designed as an axial flux machine, is directed axially to a direction of rotation of the rotor of the axial flux machine in the air gap between the stator and the rotor. There are different types of axial flux machines. A well-known type is a so-called I arrangement, in which the rotor is arranged axially next to a stator or between two stators. Another well-known type is a so-called H arrangement, in which two rotors are arranged on opposite axial sides of a stator.

The stator of an electric axial flux machine has a stator body with a plurality of stator windings arranged in the circumferential direction. The stator body can be formed in one piece or to be segmented, seen in the circumferential direction. The stator body can be formed from a stator laminated core with multiple laminated electrical sheets. Alternatively, the stator body can also be formed from a compressed soft magnetic material, such as so-called SMC (Soft Magnetic Compound) material.

A rotor shaft is a rotatably mounted shaft of an electric machine to which the rotor or rotor body is coupled in a non-rotatable manner.

The rotor of an electric axial flux machine can be designed at least in parts as a laminated rotor. A laminated rotor is designed to be layered in the axial direction. The axial magnetic flux has to overcome the adhesive or insulation layers between the stacked individual electrical sheets, which causes the magnetic circuit to experience shear (additional air gap) and lose efficiency. Alternatively, the rotor of an axial flux machine can also have a rotor carrier which is correspondingly equipped with magnetic sheets and/or SMC material and with magnetic elements designed as permanent magnets.

Advantageous embodiments are specified in the below and in the claims. The features listed individually herein can be combined with one another in a technologically meaningful manner and can define further embodiments according to the disclosure. In addition, the features are specified and explained in more detail in the description, in which further preferred embodiments are shown.

According to an advantageous embodiment, it can be provided that actually each of the wound stator teeth is split, seen in the radial direction, into at least two stator part teeth, whereby the optimized winding cross-section of the axial flux machine is fully utilized.

According to a further preferred further development, it can also be provided that the stator winding of a stator tooth is subdivided into at least two sub-groups. A first sub-group of the stator winding encloses the radially outermost stator part tooth and each further sub-group in each case additionally encloses the next stator part tooth arranged radially in the direction of the stator central axis X, wherein the last sub-group encloses all stator part teeth. This allows particularly efficient winding of the stator teeth with a high winding cross-section, especially in the radially outer areas, without having to design the flux-conducting elements in the radially inner areas to be unfavorably narrow. This allows a more constant ratio of winding cross-section to flux conducting material to be achieved on the different diameters.

As an alternative to the type of winding of a stator tooth described above, it can be provided that the stator winding of a stator tooth is subdivided into sub-groups, wherein a first sub-group encloses a stator part tooth arranged between the radially outermost stator part tooth and the radially innermost stator part tooth and each further sub-group in each case additionally encloses in each case the next stator part tooth arranged radially in the direction of the stator central axis X and/or in the direction radially away from the stator central axis X. This can reduce torque fluctuations during operation, e.g. due to the pole grid (similar to interleaving the magnets with respect to the winding grooves). Furthermore, ohmic losses and the associated heating can be specifically concentrated in defined regions of the stator.

According to a further particularly preferred embodiment, it can be provided that the separating grooves formed between the stator part teeth are formed in a circular arc with the center in the stator central axis X or formed in a circular arc with the center outside the stator central axis X or rectilinear as a secant of a circle and forming a polygon shape. In particular, this improves the mountability of the windings. Furthermore, unnecessary bends of the winding heads can be avoided, thus optimizing the electric resistance.

Furthermore, the disclosure can also be further developed in that a pole shoe cap is separably attached in one piece, extending over all stator part teeth, at the end face of the free axial end of individual stator part teeth. The closed pole shoe cap increases the strength of the stator and achieves a more favorable magnetic flux in the air gap.

In a further development of the pole shoe cap, it can be provided that partial regions of individual stator part teeth extending in the axial direction are formed on the pole shoe cap, wherein the partial regions of the stator part teeth on the pole shoe cap interact in a form-fitting manner with partial regions of the stator part teeth in such a way that a form-fit is ensured in the circumferential or tangential direction for torque transmission.

This allows the circumferential forces to be transmitted from the pole shoe cap to the stator in a particularly simple and robust manner.

It can also be advantageous in that a single layer or at most two layers of a sub-group of the stator winding are arranged one above the other in at least one of the separating grooves of a stator part tooth, seen in the radial direction. This can be used to promote local cooling of the windings in a targeted manner.

According to a further preferred embodiment of the subject matter of the disclosure, it can be provided that the stator is designed to operate an electric machine in an H arrangement with rotor bodies arranged axially on both sides, wherein the stator body is preferably designed mirror-symmetrical to a plane perpendicular to the axis of rotation of the electric machine.

Furthermore, the object of the disclosure is achieved by an electric axial flux machine comprising at least one stator as well as a first rotor body arranged on a rotor shaft or comprising a stator as well as a first rotor body arranged on a rotor shaft and a second rotor body arranged on the rotor shaft, wherein the at least one stator of the machine is designed according to the stator described above. This provides an electric axial flux machine that realizes an optimized winding cross-section of the stator teeth compared to axial flux machines of the same size.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so that where applicable, explanations from other figures can also be used.

In the figures.

DETAILED DESCRIPTION

Figure 1:
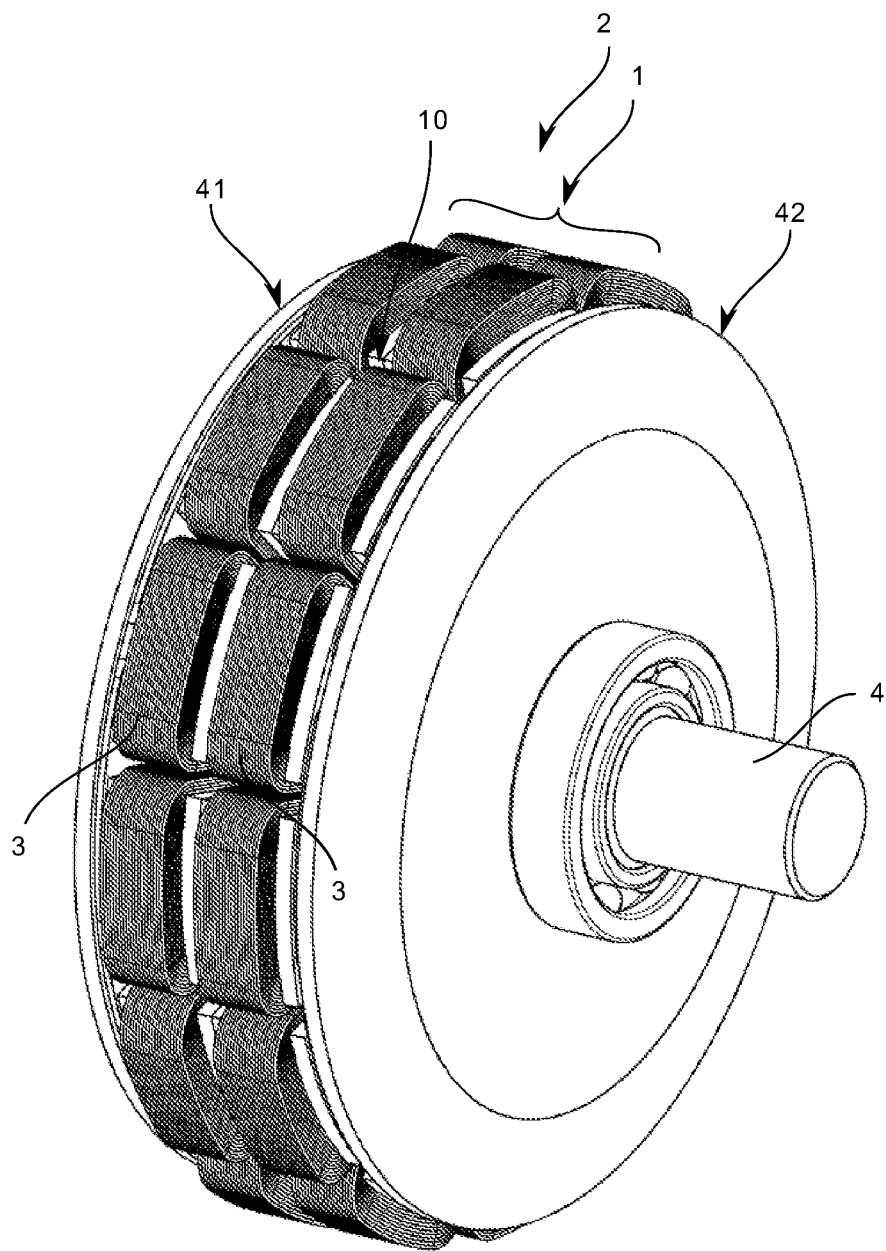
FIG. 1: shows a schematic perspective view of an axial flux machine in an H arrangement with single-tooth winding.

FIG. 1 shows a schematic perspective view of an axial flux machine 2 in an H arrangement with single-tooth winding. The axial flux machine 2 shown comprises a stator 1 arranged axially centrally between two rotor bodies 41, 42 arranged on a rotor shaft 4. The stator 1 has a stator body with stator teeth 11 directed axially outward on both sides, on which corresponding stator windings 3 are applied in the form of single-tooth windings. Bearings are mounted on the rotor shaft 4 axially outside the two rotor bodies 41, 42 to rotatably support the electric axial flux machine 2 in corresponding bearing receptacles of a housing.

Figure 2:
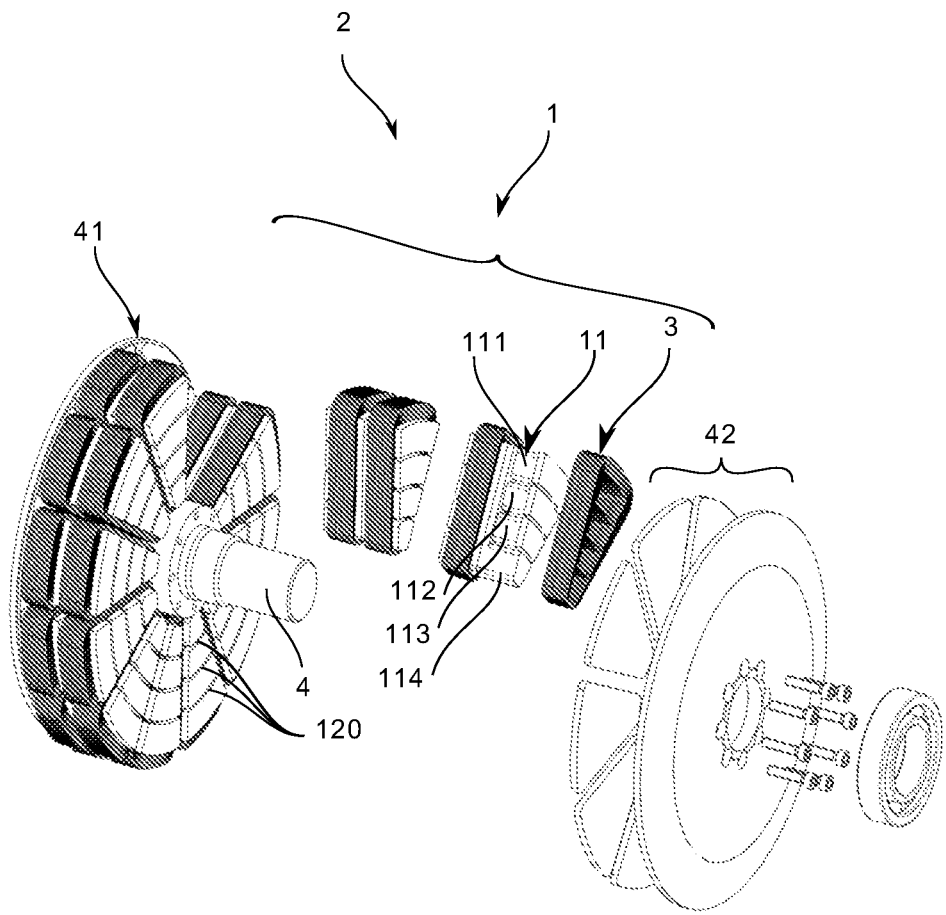
FIG. 2 shows the axial flux machine according to FIG. 1 in a partial exploded view.

FIG. 2 shows the axial flux machine 2 according to FIG. 1 in a partial exploded view. The permanently excited electric axial flux machine 2 comprises the stator 1 arranged axially centrally having a stator body 10 formed of a plurality of stator teeth 11 distributed around the circumference and stator windings 3 wound and formed around each of the stator teeth 11 as a winding concentrated as a single-tooth winding.

Each of the wound stator teeth 11 has a total of four stator part teeth 111, 112, 113, 114 as seen in the radial direction, wherein the four stator part teeth 111, 112, 113, 114 are spaced apart in the radial direction by a separating groove 120 extending in the circumferential direction and formed at axial depth. In the partial exploded view, it is easy to see that the stator windings 3 can be wound separately from the stator tooth body 11 as single-tooth windings and later applied to the stator tooth body 11. The first and second rotor bodies 41, 42 each have a circular ring-shaped carrier plate on which a plurality of permanent magnets in the shape of pieces of cake matched to the stator teeth 11 are arranged. The rotor bodies 41, 42 are attached in a non-rotatable manner in the axial direction to a retaining ring mounted on the rotor shaft 4 by means of a total of eight circumferentially distributed fastening screws.

Figure 3:
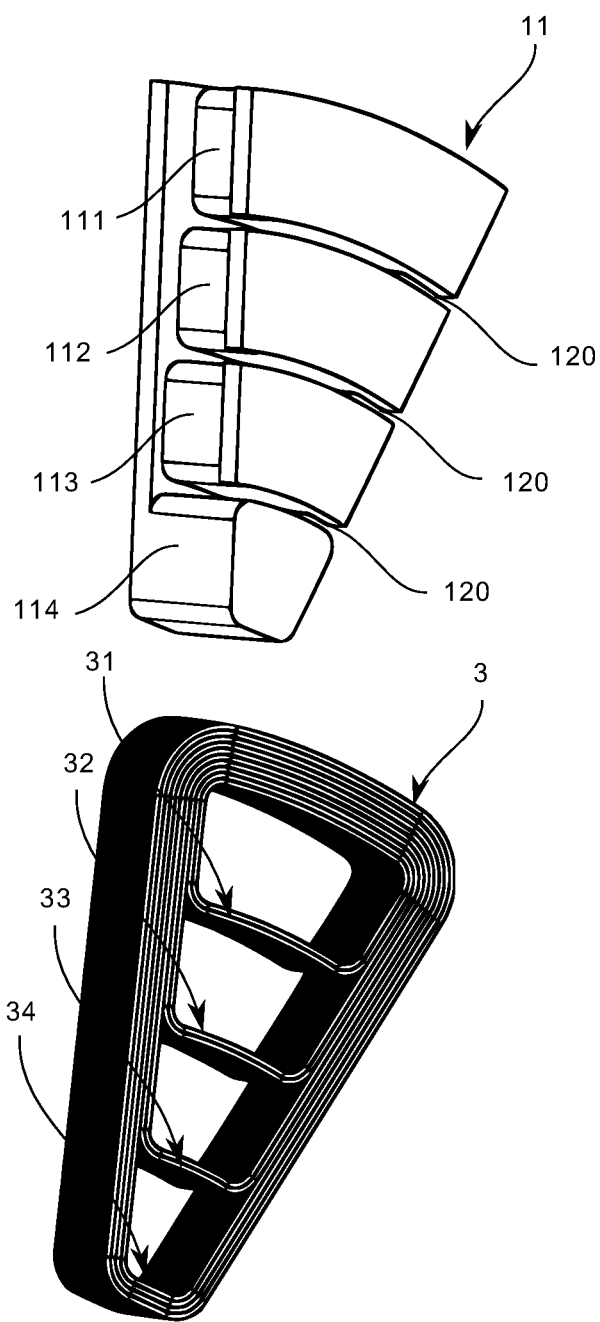
FIG. 3 shows a stator tooth with a stator tooth body (top) and a stator tooth winding (bottom) of a segmented stator according to the disclosure in a schematic perspective view.
Figure 4:
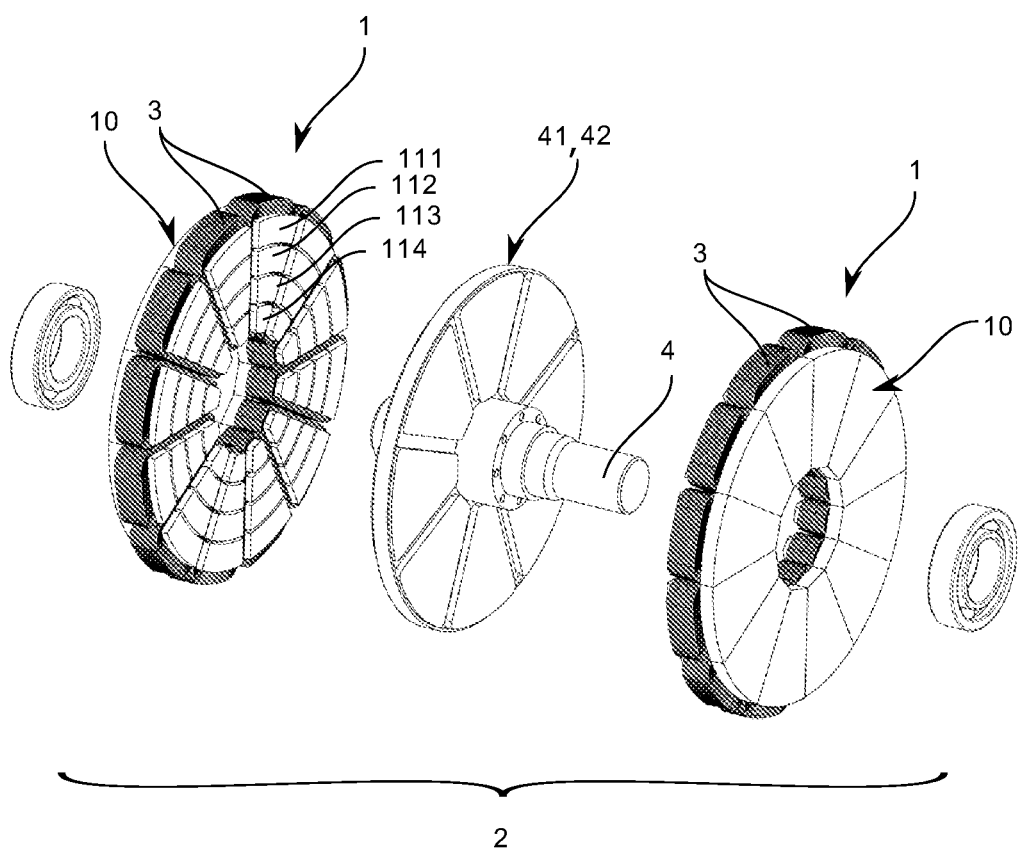
FIG. 4 shows an axial flux machine in an I arrangement with two stators enclosing a rotor centrally between them and constructed according to the disclosure in an exploded view.

FIG. 3 shows a stator tooth 11 with a stator tooth body (top) and a stator tooth winding (bottom) of a segmented stator 1 as shown in FIG. 4 in a schematic perspective view. It can be clearly seen in this view that a stator tooth 11 has individual stator part teeth 111, 112, 113, 114, each of which is separated from the other in the radial direction by a separating groove 120 of axial depth extending in the circumferential direction. On the bottom side, the stator part teeth 111, 112, 113, 114 are connected to one another via a plate-like base part. In the lower illustration, the structure of the stator winding 3 can be clearly seen, wherein the stator winding is split into sub-groups 31, 32, 33, 34 of winding layers or sub-windings. In the present example, each of the stator part teeth 111, 112, 113, 114 is wound with a different number of turns of the stator winding 3 or with its own sub-group of the stator winding 3. Starting from the radially outer stator part tooth 111, which is wound with two winding layers (in the separating groove), the next inner stator part tooth 112 is additionally wound so that the first stator part tooth 111 then already has four winding layers at the head end and two winding layers at the base end in the separating groove 120, and the additionally wound second stator part tooth 112 has the two winding layers at the head end in the first separating groove 120 and also two winding layers at the base end of the second sub-group 32 of the stator winding 3. In this way, the other two stator part teeth 113, 114 are gradually wound as well, so that in the stator winding 3 shown, exactly two winding layers are arranged in each separating groove 120. Thus, with this type of winding, 4×2 winding layers—i.e., a total of at least eight winding layers—would be wound on the head side above and in the circumferential direction on the first stator part tooth 111. In fact, however, the stator tooth 11 has two additional winding layers wrapped around it from the outside, so that a total of ten winding layers come together here.

FIG. 4 shows an axial flux machine 2 in an I arrangement with two stators 1 enclosing a rotor body 41, 42 centrally between them and constructed according to the disclosure in an exploded view. The centrally arranged rotor body 41, 42 has a plurality of permanent magnets distributed circumferentially axially on both sides, each of which interacts with the stator tooth bodies which are spaced apart by an air gap and are wound.

Figure 5:
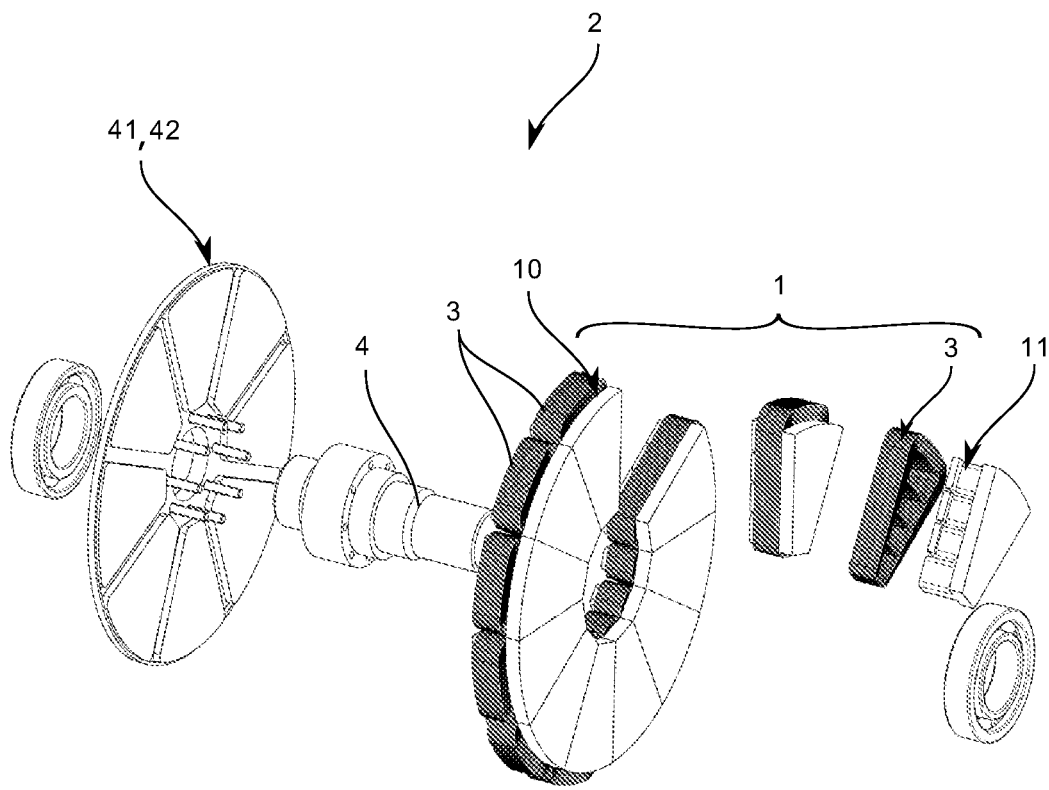
FIG. 5 shows an axial flux machine in an I arrangement with a stator arranged axially adjacent to a rotor and constructed according to the disclosure in an exploded view.

FIG. 5 shows an axial flux machine 2, also in an I arrangement, with only one stator 1 arranged axially adjacent to a rotor and constructed in accordance with the disclosure in an exploded view. The stator is constructed in the same way as described above.

Figure 6:
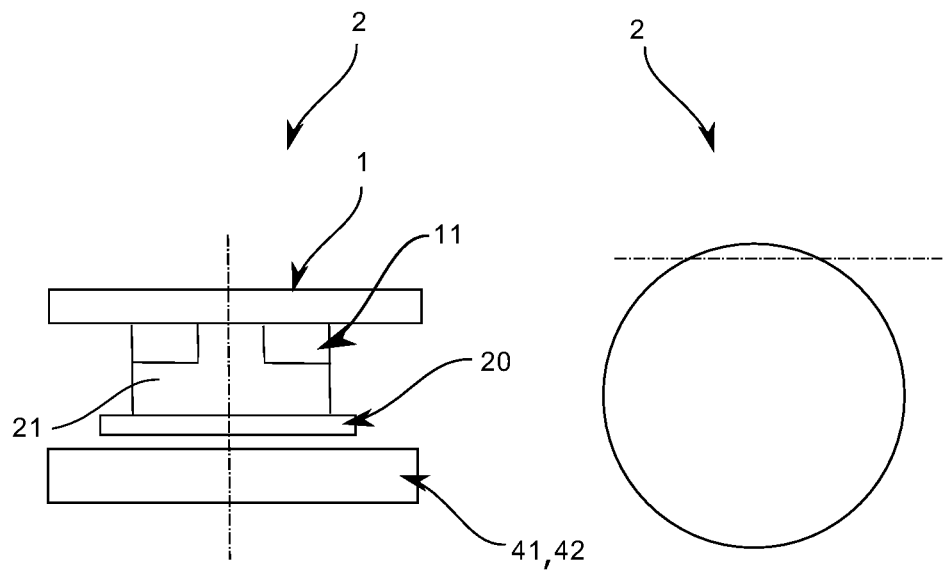
FIG. 6 shows a sectional view of an electric machine similar in construction to the electric machine in FIG. 5 or FIG. 1 in a schematic view.

FIG. 6 shows a sectional view through an electric machine 2 in a schematic view. The illustration on the right shows the sectional plane, while the illustration on the left shows a view from above of the highly schematized sectional plane. The stator 1 is clearly visible with a stator tooth 11 extending axially in the direction of the rotor body 41, 42. In this regard, a partial region 21 of the stator tooth 11 is formed on a pole shoe cap 20 to be attached axially to the stator tooth 11 at the end face, so that the complete stator tooth 11 is not formed until the pole shoe cap 20 is mounted. In this regard, the pole shoe cap 20 is separably attached, advantageously in one piece, extending over all stator part teeth 111, 112, 113, 114, at the end face on the free axial end of individual stator part teeth 111, 112, 113, 114. The partial regions 21 of the stator teeth 11 attached to the pole shoe cap 20 interact in a form-fitting manner with partial regions of the stator part teeth 111, 112, 113, 114 in such a way that a form-fit is ensured in the circumferential or tangential direction for torque transmission.

The disclosure is not limited to the embodiments shown in the figures. The above description should therefore be regarded as explanatory rather than restrictive. The following claims are to be understood as meaning that a said feature is present in at least one embodiment of the disclosure. This does not preclude the presence of other features. Where the claims and the foregoing description define 'first' and 'second' features, this designation serves to distinguish two features of the same kind without establishing an order of precedence.

LIST OF REFERENCE SYMBOLS

1 Stator
2 Axial flux machine
3 Stator winding
4 Rotor shaft
10 Stator body
11 Stator tooth
111 Stator part tooth
112 Stator part tooth
113 Stator part tooth
114 Stator part tooth
20 Pole shoe cap
21 Partial region of stator part tooth (formed on pole shoe cap)
31 Stator winding sub-group
32 Stator winding sub-group
33 Stator winding sub-group
34 Stator winding sub-group
41 Rotor body
42 Rotor body

The invention claimed is:

1. A stator for an electric axial flux machine that is a prime mover for an electrically driven motor vehicle, the stator comprising:
    a stator body with a plurality of stator teeth distributed around a circumference thereof;
    stator windings arranged around the stator teeth; and at least one of the stator teeth is split, seen in a radial direction, into at least two stator part teeth, wherein the at least two stator part teeth are wound with a different number of turns of the stator winding;
wherein the at least two stator part teeth are wound with a different number of turns of a same phase of the stator winding.

2. The stator according to claim 1, wherein each of the wound stator teeth, seen in the radial direction, is split into at least two of the stator part teeth.

3. The stator according to claim 1, wherein the stator winding of one said stator tooth is subdivided into at least two sub-groups, a first of said sub-groups encloses a radially outermost said stator part tooth and each further one of said sub-groups in each case additionally encloses a next said stator part tooth arranged radially in a direction of the stator central axis, and a last one of said sub-groups encloses all said stator part teeth.

4. The stator according to claim 1, wherein the stator winding of one said stator tooth is subdivided into sub-groups, a first of said sub-groups encloses one said stator part tooth arranged between a radially outermost said stator part tooth and a radially innermost said stator part tooth and each further said one of the sub-groups in each case additionally encloses the next stator part tooth arranged radially in a direction of the stator central axis and/or in the direction radially away from the stator central axis.

5. The stator according to claim 1, further comprising separating grooves formed between the stator part teeth are formed in a circular arc with a center in the stator central axis or formed in an arc with the center outside the stator central axis or rectilinear forming a polygon shape.

6. The stator according to claim 1, further comprising a pole shoe cap separably attached in one piece, extending over all said stator part teeth, at an end face on a free axial end of individual ones of the stator part teeth.

7. The stator according to claim 6, wherein partial regions of individual ones of said stator part teeth are formed on the pole shoe cap.

8. The stator according to claim 5, wherein in at least one of the separating grooves of one said stator part tooth, seen in a radial direction, a single or at most two layers of a sub-group of the stator winding are arranged.

9. The stator according to claim 1, wherein the stator is configured to operate an electric machine in an HI arrangement with rotor bodies arranged axially on both sides, and the stator body is mirror-symmetrical to a plane perpendicular to an axis of rotation of the electric machine.

10. An electric axial flux machine, comprising at least one said stator according to claim 1, and a first rotor body arranged on a rotor shaft or a first rotor body and a second rotor body.

11. An electric flux machine, comprising:
a stator having a stator body with a plurality of stator teeth distributed around a circumference thereof, stator windings arranged around the stator teeth, wherein at least one of the stator teeth is radially split into at least two stator part teeth, and the at least two stator part teeth are wound with a different number of turns of the stator winding; a first rotor body arranged axially adjacent to a first side of the stator, wherein the at least two stator part teeth are wound with a different number of turns of a same phase of the stator winding.

12. The electric flux machine according to claim 11, wherein each of the wound stator teeth, seen in the radial direction, is split into at least two of the stator part teeth.

13. The electric flux machine according to claim 11, wherein the stator winding of one said stator tooth is subdivided into at least two sub-groups, a first of said sub-groups encloses a radially outermost said stator part tooth and each further one of said sub-groups in each case additionally encloses a next said stator part arranged radially in a direction of the stator central axis, and a last one of said sub-groups encloses all said stator part teeth.

14. The electric flux machine according to claim 11, wherein the stator winding of one said stator tooth is subdivided into sub-groups, a first of said sub-groups encloses one said stator part tooth arranged between a radially outermost said stator part tooth and a radially innermost said stator part tooth and each further said one of the sub-groups in each case additionally encloses the next stator part tooth arranged radially in a direction of the stator central axis and/or in the direction radially away from the stator central axis.

15. The electric flux machine according to claim 11, a second rotor body arranged axially adjacent to a second side of the stator.

16. The electric flux machine according to claim 11, further comprising a second stator that is identical to the stator arranged on an opposite side of the rotor from the stator.

17. A stator for an electric axial flux machine that is a prime mover for an electrically driven motor vehicle, the stator comprising:
a stator body with a plurality of stator teeth distributed around a circumference thereof;
stator windings arranged around the stator teeth;
at least one of the stator teeth is split, seen in a radial direction, into at least two stator part teeth, wherein the at least two stator part teeth are wound with a different number of turns of the stator winding; and
wherein the stator winding of one said stator tooth is subdivided into sub-groups, a first of said sub-groups encloses one said stator part tooth arranged between a radially outermost said stator part tooth and a radially innermost said stator part tooth and each further said one of the sub-groups in each case additionally encloses the next stator part tooth arranged radially in a direction of the stator central axis and/or in the direction radially away from the stator central axis.

* * * * *